United States Patent [19]

Miyo et al.

[11] Patent Number: 4,764,730
[45] Date of Patent: Aug. 16, 1988

[54] RADIO RECEIVER DEMODULATION SYSTEM

[75] Inventors: Tokihiro Miyo, Kawasaki; Toshio Kawasaki, Yokohama, both of Japan

[73] Assignee: Fujitsu Limited, Kawasaki, Japan

[21] Appl. No.: 16,774

[22] Filed: Feb. 20, 1987

[30] Foreign Application Priority Data

Feb. 20, 1986 [JP]  Japan ................................ 61-33965

[51] Int. Cl.⁴ .......................................... H04L 21/20
[52] U.S. Cl. ...................................... 329/50; 329/124; 375/81; 375/120
[58] Field of Search ................. 329/50, 110, 120, 122, 329/124; 375/80, 81, 82, 94, 97, 120; 455/214, 260

[56] References Cited

U.S. PATENT DOCUMENTS 4,525,676 6/1985 Atobe et al. ..................... 329/124 X
4,546,322 10/1985 Crutcher .......................... 329/124 X Primary Examiner—Eugene R. LaRoche
Assistant Examiner—Robert J. Pascal
Attorney, Agent, or Firm—Staas & Halsey

[57] ABSTRACT

A radio receiver demodulation system which utilizes a sweep track type phase lock circuit and provides stable demodulation by starting and stopping the sweep on the basis of a decoded code error.

6 Claims, 6 Drawing Sheets

RADIO RECEIVER DEMODULATION SYSTEM

BACKGROUND OF THE INVENTION

The present invention relates to a radio receiver demodulator capable of stably receiving a phase modulated signal. In satellite communication systems, a PSK (Phase Shift Keying) or QAM (Quadrature Amplitude Modulation) system is often employed because of its transmission efficiency. In the case of demodulating a signal that has been modulated by such a modulation system, the carrier is recovered from the modulated signal and used for phase detection. However, when a number of modulation phases is considered as n, carrier frequency as $f_o$, clock frequency of the received digital signal as $f_{CL}$, the recovered carrier is pulled and stabalized at the frequency $f_o + m/n\ f_{CL}$ (where $m = \pm 1, \pm 2, \pm 3 \ldots$) as well as the correct frequency $f_o$, so the carrier may sometimes be pulled falsely due to noises. Therefore, it is necessary to control the recovered carrier so that it is pulled to the correct frequency and it is expected to form a structure where the carrier is pulled stably to the correct frequency even under the condition of a bad signal to noise ratio.

In order to correct such false pull-in of the recovered carrier, a sweep track type phase lock loop (PLL) circuit is used. In this circuit a phase error signal or a frequency discrimination signal generated by the demodulator being higher than a threshold level indicates an asynchronous condition (i.e., an unlocked condition or a false lock condition). As a result, a sweep signal is applied as a control voltage of a voltage controlled oscillator used in recovering the carrier signal; this pulls the carrier to the correct frequency. The pull-in range is equivalently widened due to sweeping the recovered carrier frequency. The sweep is stopped when a phase lock condition is achieved on the correct frequency.

However, in demodulation utilizing the sweep track type phase lock loop circuit, if a high level noise is included in an input signal, the circuit erroneously detects asynchronization and sweep is started even through the recovered carrier is locked to the optimum phase on the correct frequency. The code error characteristic is therefore deteriorated when the sweep is erroneously started under the phase lock condition on the correct frequency as explained above.

On the other hand, in recent satellite communication systems, the systems are expected to operate normally even when the signal to noise ratio of a received signal is 0 dB or less. In an attempt to achieve this, a highly effective error correcting technique is employed. This error correction technique is expected to be further developed in the future and therefore the demodulator is also expected to operate stably even when a signal to noise ratio is low.

SUMMARY OF THE INVENTION

An object of the present invention is to provide a radio receiver utilizing a sweep track type phase lock loop demodulation system wherein stable demodulation is achieved by starting and stopping the sweep based on decoded code error information.

The present invention controls the recovered carrier by starting and stopping a sweep of the carrier based on error information of the decoded code. For example, use of error correction frequency information, or error correction locking state information available from an error correction circuit, quickly pulls the carrier to the correct frequency and avoid erroneous sweeping; thus, realizing stable demodulation even in the presence of a high level of noise in the input signal.

The above and other objects and advantages of the present invention will be apparent to those skilled in the art, from the following details of construction of the present invention. In the following, reference is made to the accompanying drawings in which like numerals refer to like parts throughout.

DESCRIPTION OF THE PREFERRED EMBODIMENTS

Figure 1:
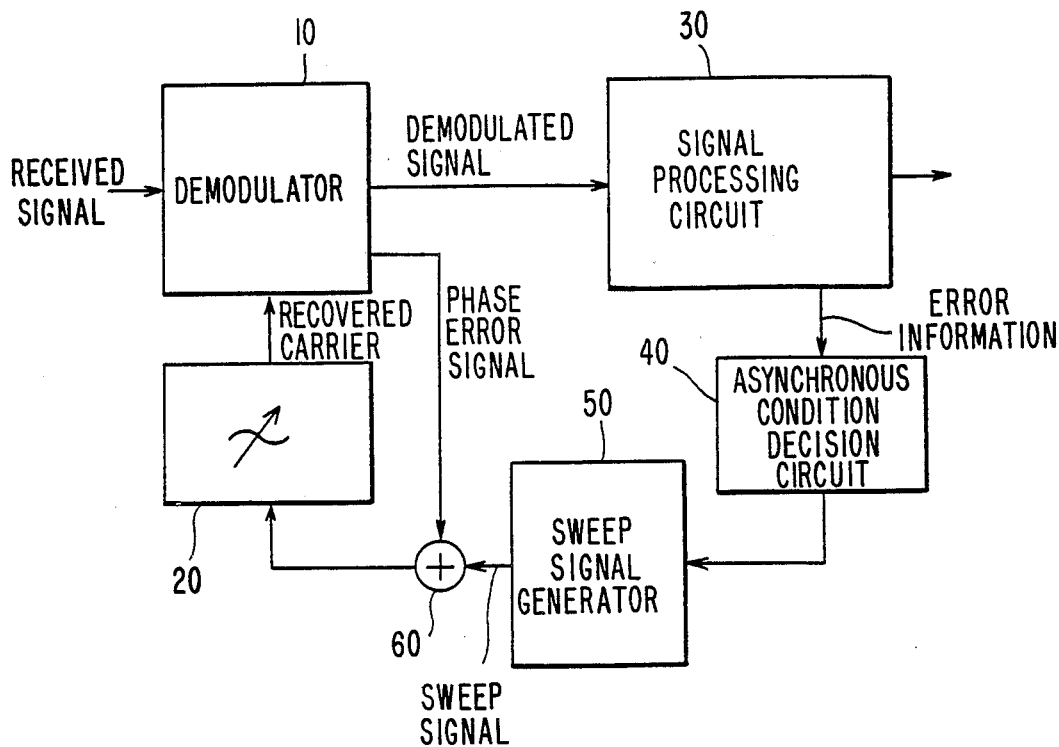
FIG. 1 is a block diagram of a radio receiver demodulation system demodulation system of the present invention.

FIG. 1 is a block diagram of the present invention. In FIG. 1 a demodulator 10 demodulates a received signal and outputs a phase error signal, a voltage controlled oscillator 20 applies a recovered carrier signal to the demodulator based on the phase error signal, a sweep signal generator 50 generates a sweep signal for sweeping the oscillation frequency of the voltage controlled oscillator 20, a signal processing circuit 30 detects and corrects a code error of the demodulated signal, and an asynchronous condition decision circuit 40 decides an asynchronous condition based on error information obtained by the code error detection function of the signal processing circuit 30. A control voltage for the voltage controlled oscillator 20 is thus provided through an adder 60 based upon the phase error signal generated by the demodulator 10 and the sweep signal generated by the sweep signal generator 50.

Based on the error information detected and provided by the code error detecting function of the signal processing circuit 30, the asynchronous condition decision circuit 40 starts and stops the sweep by controlling the sweep signal generator 50. The error information includes error correction frequency information which is obtained when the signal processing circuit 30 is used as a code error correction circuit. Namely, when the recovered carrier is locked to the optimum phase on the correct frequency, code error of a demodulated signal can be reduced even if a signal to noise ratio is bad. Erroneous sweeping of the carrier is therefore avoided, thus assuring stable demodulation.

Figure 2:
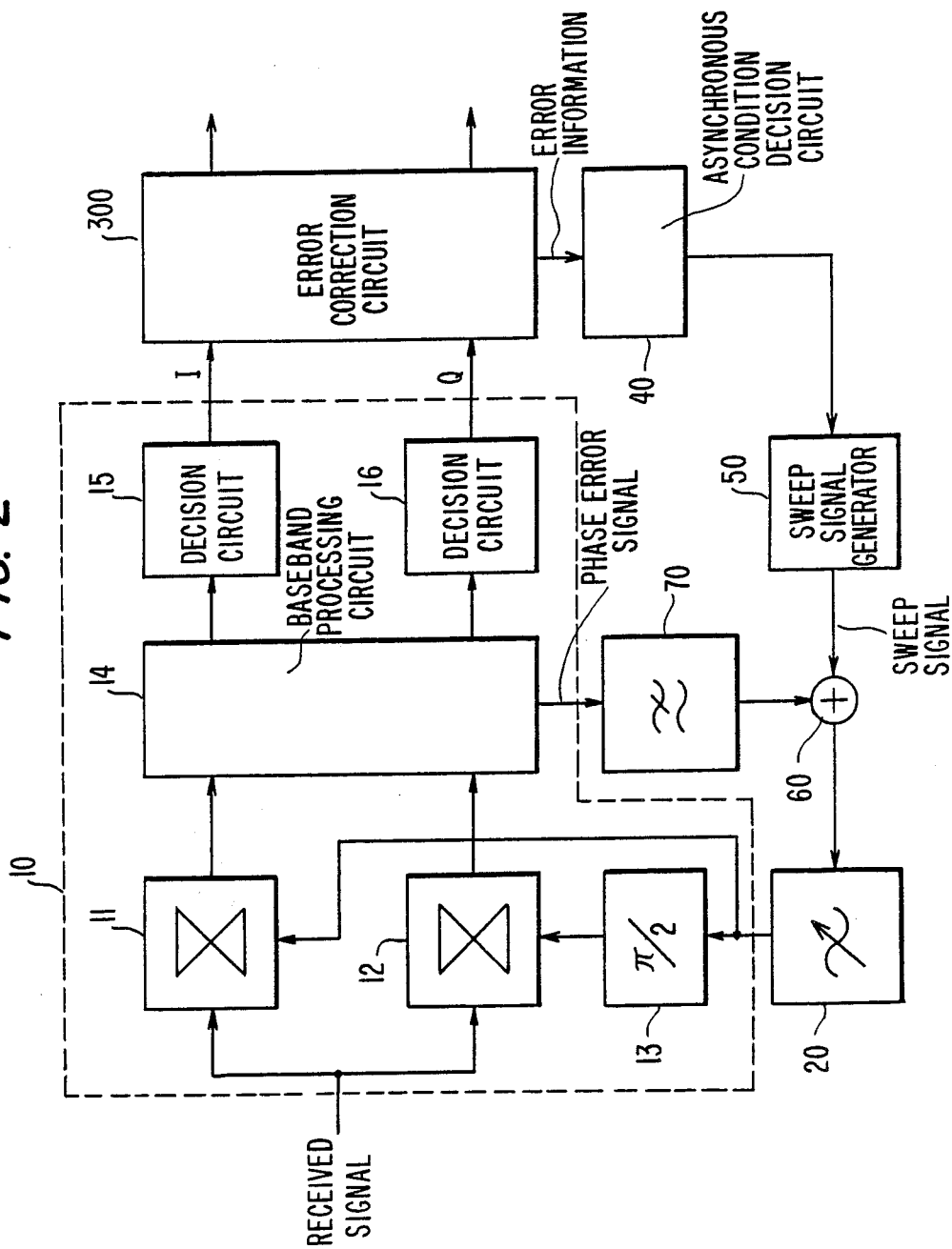
FIG. 2 is a block diagram of a radio receiver demodulation system including a first embodiment of the present invention.

FIG. 2 is a block diagram of a first embodiment of the present invention, and illustrates a demodulation system for a 4-phase modulated signal. In FIG. 2, reference numerals 11 and 12 represent phase detectors; reference numeral 20 identifies a voltage controlled oscillator; reference numeral 13 identifies a 90°-phase shifter; reference numeral 14 denotes a baseband processing circuit employing a well known Costas circuit (see e.g., Gardner, *Phaselock Techniques*, John Wiley & Sons, pp. 217-225 (2d. ed. 1979).; reference numeral 70 denotes a loop filter; reference numeral 60 denotes an adder; reference numerals 15 and 16 identify decision circuits; reference numeral 300 denotes an error correction circuit as an example of the signal processing circuit; reference numeral 40 denotes an asynchronous condition decision circuit; and reference numeral 50 denotes a sweep signal generator.

The recovered carrier provided by the voltage controlled oscillator 20 is applied to the phase detectors 11 and 12, with a phase difference of 90° due to the phase shifter 13. As a result, the phases of the received signal are detected for demodulation. The demodulated signal is then applied to the baseband processing circuit 14 which provides a phase error signal to the loop filter 70. The frequency and phase error signal thus functions as the control voltage of voltage controlled oscillator 20, applied through the adder 60. The phase of the recovered carrier is therefore controlled, following frequency variation of the input signal.

The decision circuits 15 and 16 decide and set levels of the demodulated signal based upon recovery timing of bits in the demodulated signal (i.e., decision timing). This signal is applied to the error correction circuit 300. The error correction circuit 300 performs error correction for received signal coding formats such as block codes and convolutional codes. Therefore, the error correction circuit 300 can be said to have a code error detecting function. For example, when a block code is used, since a redundant bit is added for error correction, it is used for error correction. Thereby, the error bit is corrected by formation of the syndrome of the demodulated signal and such error correction frequency is counted for every constant period in order to form error correction frequency information (error information).

If the resulting information has an abnormally large value, then the demodulator can be detected as operating on an incorrect carrier frequency. This situation is detected by the asynchronous condition decision circuit 40. In this case, the sweep signal generator 50 is started and the sweep signal is applied to the voltage controlled oscillator 20 through the adder 60. Thereby, the frequency of the recovered carrier is swept. If the error information has a small value, then the demodulator can be detected as operating on the correct carrier frequency. Therefore, the asynchronous condition decision circuit 40 stops operation of the sweep signal generator 50. Accordingly, only the phase error signal is output by the adder 60 through the loop filter 70 and the thus, voltage controlled oscillator 20 is controlled, following variation of frequency of the receiving signal.

When a convolutional code is used, a Viterbi decoder, etc. is used as the error correction circuit 300 (U.S. Pat. No. 4,614,933). If a code error rate is large when a Viterbi decoder is used, an increase rate of passmetric also becomes large and since this passmetric is normalized (e.g., to prevent overflow of an operational circuit within Viterbi decoder), error detection information can be formed by counting this normalized signal.

When a 4-phase modulated signal is demodulated, the demodulated signal has a stable point in every 90° even on the correct frequency. The recovery circuit may therefore lock at a stable point other than the optimum phase point. The demodulated signal must therefore be reversed or interchanged and a phase change circuit is provided for this purpose. The phase change information for controlling such a phase change circuit is generated on the basis of the code error information. If the recovered carrier is locked on an incorrect frequency, the phase appointed by the phase change information changes frequently. Therefore, it is also possible to detect code errors and detect the asynchronous condition by making use of such phase change information.

Figure 3:
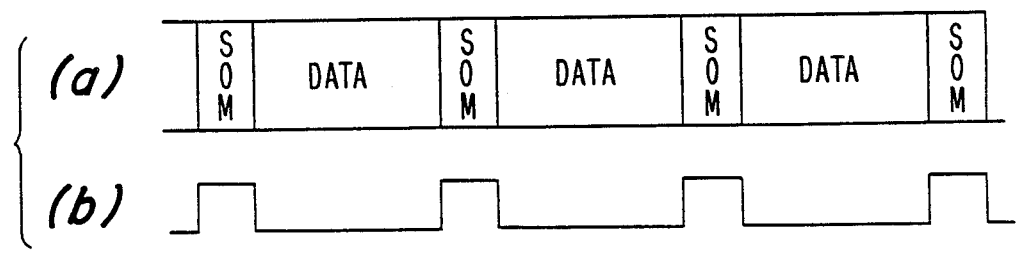
FIG. 3 is a schematic diagram illustrating a receiving signal.

This phase change information can be formed from the correction frequency information or the counting information of the normalized signal in the Viterbi decoder as explained above. As shown in FIG. 3(a), a start of message (SOM) signal in the received signal can also be used. Namely, the start of message signal SOM is extracted from the frame timing signal shown in FIG. 3(b) and an asynchronous condition can be decided depending upon whether or not the start of message SOM signal is correctly decoded.

Figure 4:
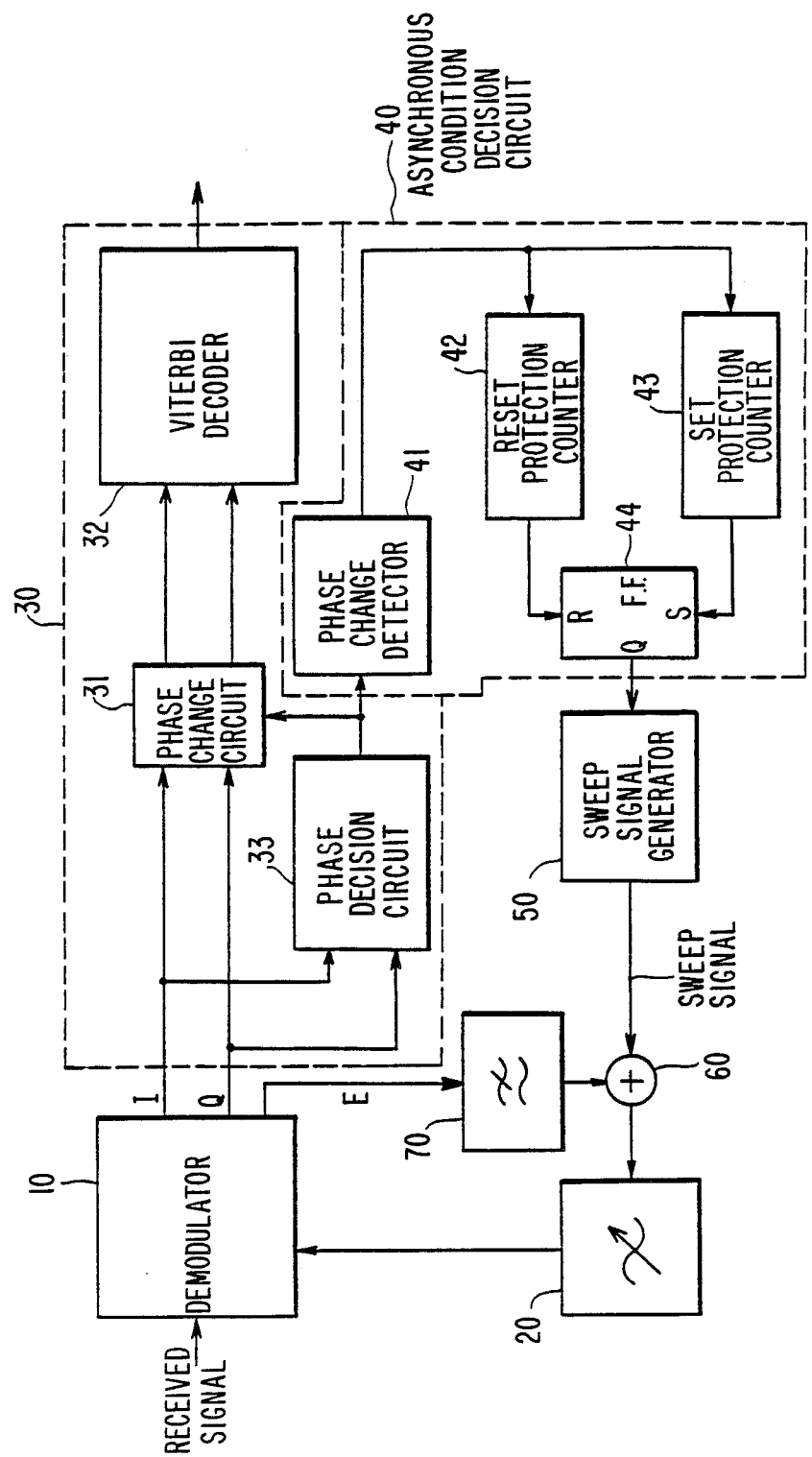
FIG. 4 is a block diagram of a radio receiver demodulation system including a second embodiment of the present invention.

FIG. 4 is a block diagram of a second embodiment of the present invention. This embodiment counts the normalized signal in a Viterbi decoder to decide if an asynchronous condition exists. In FIG. 4, reference numeral 10 identifies a demodulator; reference numeral 20 denotes a voltage controlled oscillator; reference numeral 30 denotes a circuit comprising a Viterbi decoder and a phase change circuit as an example of the signal processing circuit 30; reference numeral 70 denotes a loop filter; reference numeral 60 denotes an adder; reference numeral 50 denotes a sweep signal generator; reference numeral 31 denotes a phase change circuit; reference numeral 32 denotes a Viterbi decoder; reference numeral 33 denotes a phase decision circuit; reference numeral 41 denotes a phase change detector; reference numeral 42 identifies a reset counter; reference numeral 43 identifies a set counter; reference numeral 44 identifies a flip-flop. The asynchronous condition decision circuit 40 of FIG. 2 comprises a phase change detection circuit 41, reset counter 42, set counter 43 and the flip-flop 44.

The received signal is demodulated in the demodulator 10 using the recovered carrier generated by the voltage controlled oscillator 20. The demodulator 10 thereby provides the demodulated I, Q channels. In this case, a phase error signal E is applied as a control voltage to the voltage controlled oscillator 20 via the loop filter 70 and the adder 60. The frequency and phase of the recovered carrier generated by the voltage controlled oscillator 20 can be controlled to follow frequency variations of the received signal.

As explained above, in the case of 4-phase modulation, the stable point of the recovered carrier exists at four points in every 90° within the phase range of 360°. Therefore, when the I, Q channels are demodulated in any one of four demodulated data 1: (I, Q), 2: (Q,Ī), 3: ($\overline{Q}$, I) 4: (Ī, $\overline{Q}$) can be obtained in accordance with the recovered carrier phase. Under the conditions of 2, 3 and 4, the signal is not received correctly. Therefore, the phase decision circuit 38 causes I, Q channels to be interchanged and the data is inverted by controlling the phase change circuit 31. Thereby the demodulated signal having condition 1, which has the optimum phase, is applied to the Viterbi decoder 32.

The phase change circuit 31 changes the phase of the I, Q channels when a phase transition of the recovered carrier is generated, and switching is carried out frequently to avoid the demodulated signal from being noisy due to the demodulator 10 being locked falsely.

Therefore, the phase change detector circuit 41 detects changes in the control signal which controls the phase change circuit 31 and causes the reset counter 42 and the set counter 43 to count the detected signal.

Both of the counters 42 and 43 count for a certain period. After this period, if the content of the reset counter 42 is below a specified value, this counter applies a reset signal to the reset terminal R of the flip-flop 44. On the other hand, if the contents of the set counter 43 is greater than a specified value this counter applies a set signal to the set terminal S of the flip-flop 44. An output signal of, for example, the Q terminal of the flip-flop 44 functions as the start signal for the sweep signal generator 50. In this case, it is possible to change the value of the reset counter 42 that causes the reset counter 42 to output the reset signal, and also to change the value of the set counter 43 that causes the set counter 43 to output the set signal. The respective count values are set so that the desired set and reset of the sweep signal generator can be realized; that is the sweep generator operates stably and does not cause false lock due to noise in the received signal.

When the phase change circuit 31 is frequently operated in order to change the phase of the I, Q signals within a given period, the demodulator 10 is not synchronized. The flip-flop 44 is therefore set by the set counter 43 and the sweep signal generator 50 is started by the set output of the flip-flop 44, causing the generated sweep signal to be applied as a control voltage of the voltage controlled oscillator 20 through the adder 60 for sweeping frequency of the recovered carrier. However, when the demodulator 10 is phase-locked on the correct frequency, the number of times that the phase is changed by the phase change circuit 31 within a given period is reduced. The flip-flop 44 is therefore reset by the reset counter 42, and the sweep signal generator 50 is stopped by the flip-flop 44, causing the voltage controlled oscillator 20 to follow frequency variations of receiving signal based only on the phase error E as filtered by filter 70.

Figure 5:
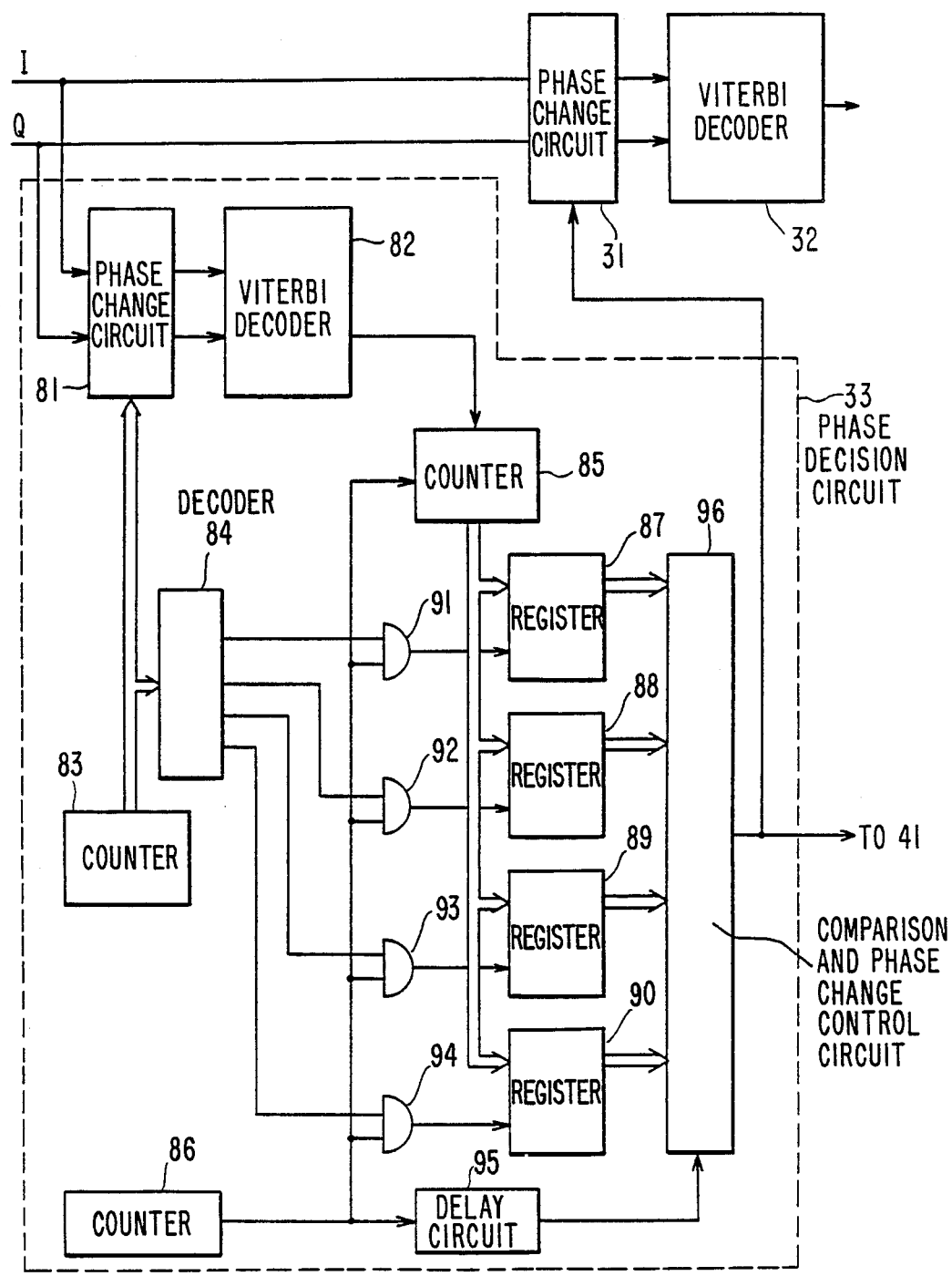
FIG. 5 is a blook diagram of a phase decision circuit.

FIG. 5 is a block diagram of the phase decision circuit 33 shown in FIG. 4. In FIG. 5, reference numerals 31 and 32 respectively identify a phase change circuit and a Viterbi decoder; reference numeral 81 denotes a phase change circuit; reference numeral 82 denotes a Viterbi decoder; reference numerals 83, 85 and 86 identify counters; reference numeral 84 denotes a decoder; reference numerals 87-90 identify registers; reference numerals 91-94 denote AND circuits; and reference numeral 95 denotes a delay circuit; and reference numeral 96 denotes a comparison and phase change control circuit.

The demodulated I, Q channels are applied to the Viterbi decoder 32 through the phase change circuit 31 for code error correction, and are also applied to the Viterbi decoder 82 through the phase change circuit 81 for phase decision through. The counter 83 is a quaternary counter which functions as a 4-phase modulated signal. The particular combination of demodulated I and Q channels (as outlined above) is changed via the phase change circuit 81 (driven by counter 83) in each given period, and one of the AND circuits 91-94 is selected by the decoder 84 which is also driven by counter 83.

The counter 85 counts the lock information generated by the Viterbi decoder 82 and applies this lock information to the registers 87-90. The counter 86 determines the given counting period for counter 85 and applies its output signal to the counter 85 to clear counter 85. The output of counter 86 is also applied to the AND circuits 91-94 and functions as a load signal for registers 87-90 via the particular AND circuit selected by the output signal of decoder 84. The counted value of counter 85 is loaded into the register to which the load signal is applied.

The comparison and phase change control circuit 96 compares the contents of each of the registers 87-90 during the given period determined by the counter 86 and the delay circuit 95. The change control circuit 96 controls the phase change circuit 31 after determining that the phase with the smallest register count is the correct phase.

In the Viterbi decoder 82 a known normalization process takes place so as to prevent overflow of an operational circuit of the decoder 82 which would be caused by the increment of the passmetric. The signal used for such normalization is used as the lock or error information. For example, as is known to those skilled in the art, within the Viterbi decoder, the normalization is carried out such that a MSB is forced to a "0" when the MSB of the passmetric sent from all ACS circuits (adder, comparator, selector) becomes "1" and the signal for forcing such MSB to a "0" is used as the lock information as explained above.

This lock information changes frequency in accordance with a code error rate and therefore it is counted during the given period by the counter 85. The demodulated I, Q channels are changed in each given period to one the following combinations: 1: (I, Q), 2: (Q, $\bar{I}$), 3: ($\bar{Q}$, I), 4: ($\bar{I}$, $\bar{Q}$), by the phase change circuit 81. The particular combination corresponds to the stable phase point of the recovered carrier. The particular combination is applied to the Viterbi decoder 82. In this case, the combination for a given period having the smallest counted value of the counter 85 is the correct phase.

Figure 6:
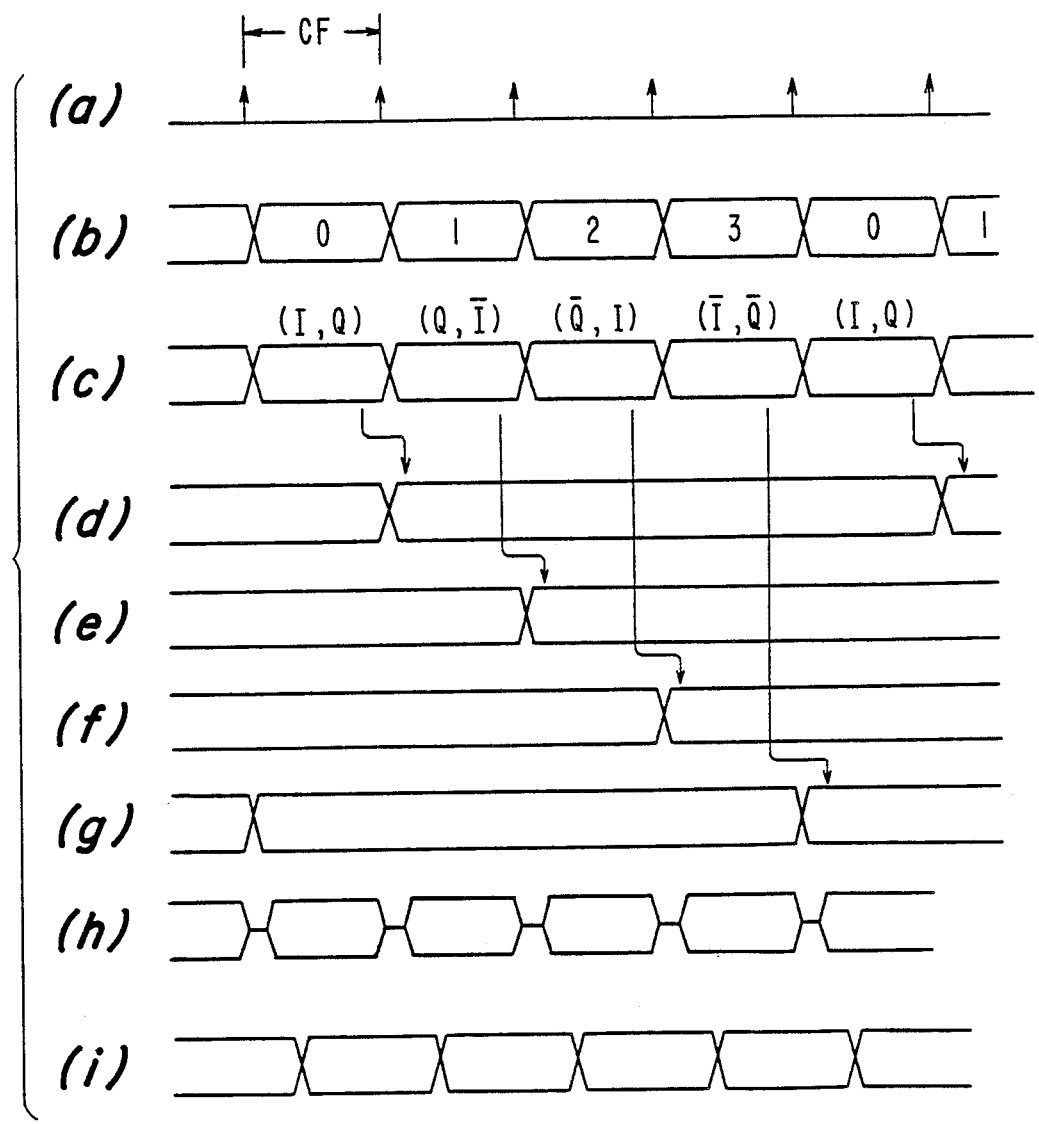
FIG. 6 is an operation timing chart of the FIG. 5 circuit.

FIG. 6 is an operation timing chart of the phase decision circuit (33 in FIG. 4). In FIG. 6, waveform (a) represents an output signal of the counter 86 and CF represents the given period. Waveform (b) represents an output signal of the counter 83. This counter is a quaternary counter that provides output signals of 0-3 and is incremented in every given period CF. As shown in FIG. 6 waveform (c) represents a content of the counter 85 and within waveform (c), (I, Q), (Q, $\bar{I}$), ($\bar{Q}$, I), ($\bar{I}$, $\bar{Q}$) indicate the combinations in each given period CF of 1-4 selectable by the phase change circuit 81. Waveforms (d)-(g) indicate the contents of the registers 87-90 and the counted values of counter 85 are set thereto as indicated by the arrow marks. Waveform (h) represents a comparison output of the comparison of the contents of registers 87-90 performed in the comparison and phase change control circuit 96. Corresponding to the register having the smallest value, the change control signal, waveform (i), is output and is then applied to both the phase change circuit 31 and the phase change detection circuit 41 shown in FIG. 4. The system for eliminating uncertain phase by comparing contents of registers 87-90 is called comparison and decision system.

Moreover, a code error rate can be obtained by coding again the data decoded by the Viterbi decoder 32 into a convolutional code and then obtaining a correlation with the input demodulated data. Therefore, it is also possible to control the sweep signal generator with the phase decision circuit on the basis of such code error rate.

Figure 7:
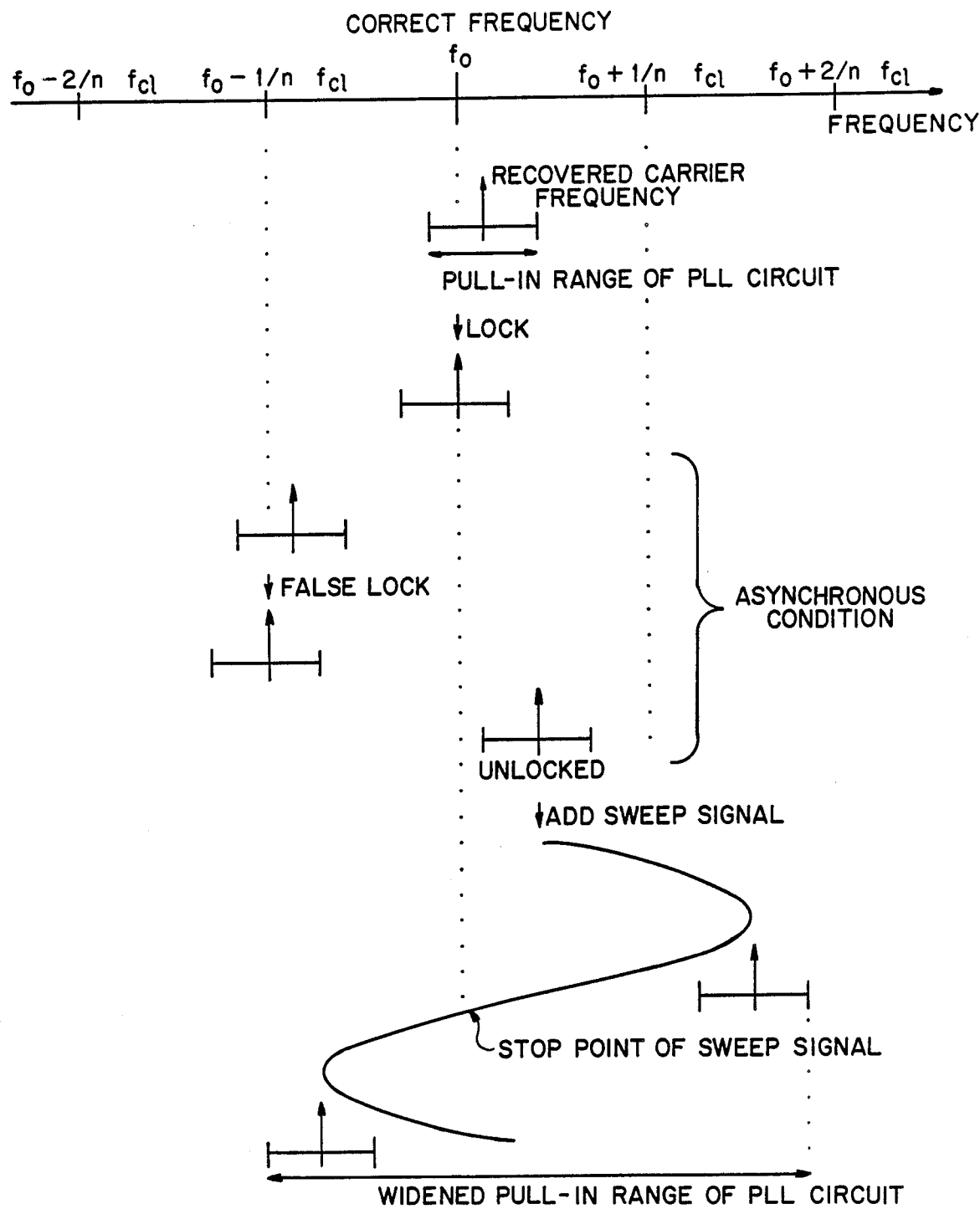
FIG. 7 illustrates a carrier synchronization scheme utilized by the present invention.

FIG. 7 illustrates a carrier synchronization scheme utilized by the present invention. If the received signal has a frequency corresponding to one of $f_o$, $f_o+1/n$, $f_{cl}$, $f_o+2/n$, $f_{cl}$, $f_o+3/n$, $f_{cl}$ . . . is in the pull-in range of the PLL circuit, then the recovered carrier is pulled into and locked onto the received signal's frequency. If the frequency is not $f_o$, then the PLL circuit is in a false locked condition. If the pull-in range of the PLL circuit does not incude any of the frequencies of the received signal, then the recovered carrier cannot be locked. This is termed the "unlocked condition."

An asynchronous condition includes both the unlocked condition as well as the false locked condition. In the asynchronous condition (e.g., the unlocked condition), the sweep signal generator 50 (FIG. 1) applies the sweep signal to the voltage controlled oscillator 20. This effectively widens the pull-in range of the PLL circuit. The sweep circuit is stopped at the correct frequency $f_o$.

As noted above, when employing 4-phase modulation, there are four stable phases at the correct frequency, $f_o$. The recovered carrier can be locked onto any of these four phases. The subject invention, however, focuses on the ability to lock onto the correct frequency; thus, avoiding the asynchronous condition. The phase decision circuit (e.g., 33 in FIG. 4) determines the correct phase lock.

The many features and advantages of the present invention are apparent from the detailed specification and it is intended by the appended claims to cover all such features and advantages of the system which fall with the true spirit and scope of the invention. Further, since numerous modifications and changes will readily occur to those skilled in the art, it is not desired to limit the invention to the exact construction and operation shown and described, and accordingly all suitable modifications and equivalents that may be resorted to, fall within the scope of the invention.

What is claimed is:

1. A radio receiver demodulation system for receiving a digital phase-modulated radio signal for providing a digital signal by demodulating said received signal, comprising;

demodulation means for demodulating said received signal in accordance with a recovered carrier, for outputting the demodulated received signal and for outputting a phase error signal varying in response to a phase difference between the recovered carrier and the received signal;

signal processing means, operatively connected to said demodulation means, for generating and outputting error information of said demodulated signal;

asynchronous condition decision means, operatively connected to said signal processing means, for deciding, based on said error information, if the recovered carrier is not synchronized to the received signal;

sweep signal generating means, operatively connected to said asynchronous condition decision means, for outputting a sweep signal when said asynchronous condition decision means decides that the recovered carrier is not synchronized to the recieved signal;

adding means for adding the sweep signal to the phase error signal and for providing an added signal having a frequency varying in accordance with the addition of the sweep signal and the phase error signal; and carrier recovery means, operatively connected to said adding means, for providing the recovered carrier having a frequency corresponding to a frequency of said added signal provided by said adding means.

2. A radio receiver demodulation system according to claim 1, wherein said received signal includes an error code and said signal processing means comprises an error correction means for providing said error information in accordance with the error code of the received signal.

3. A radio receiver demodulation system according to claim 2, wherein said error code comprises a block code and said error correction means corrects errors in said received signal, generates error correction frequency information based on syndrome and provides the error correction frequency information as said error information.

4. A radio receiver demodulation system according to claim 2, wherein said error code comprises a convolutional code and said error correction means comprises a Viterbi decoder which corrects errors in said received signal, generates a normalized count of passmetric increments and provides the normalized count information as said error information.

5. A radio receiver demodulation system according to claim 1, wherein said signal processing means comprises:

means for detecting a start of message;

means for determining if the start of message has been correctly detected and for providing an output, responsive to this determination, corresponding to said error information;

means for generating a phase change signal varying in accordance with said error information;

phase change means for changing the phase of the demodulated received signal in response to said error information; and wherein;

said asynchronous condition decision means decides if the recovered carrier is not synchronized based on said error information.

6. A radio receiver demodulation system according to claim 1, wherein said signal processing means comprises;

Viterbi decoder means for correcting errors in the demodulated received signal, and for generating a normalized count of passmetric increments;

phase decision means, operatively connected to said demodulation means, for detemining an optimum phase of the demodulated received signal in response to the normalized signal; and phase change circuit means, operatively connected to said demodulation means and to said phase decision means, for changing the phase of the demodulated received signal after changing it to a digital signal in accordance with the optimum phase determined by said phase decision means, and wherein said false lock decision means decides if the received carrier is falsely locked based on the change of the phase determined by phase decision means.

* * * * *